United States Patent [19]

Nishihata

[11] Patent Number: 5,086,350
[45] Date of Patent: Feb. 4, 1992

[54] Fθ LENS

[75] Inventor: Sumihiro Nishihata, Kanagawa, Japan

[73] Assignee: Fuji Photo Film Co., Ltd., Kanagawa, Japan

[21] Appl. No.: 573,763

[22] Filed: Aug. 28, 1990

[30] Foreign Application Priority Data

Aug. 29, 1989 [JP] Japan .................................. 1-222698

[51] Int. Cl.$^5$ ........................... G02B 26/08; G02B 9/00
[52] U.S. Cl. ...................................... 359/206; 359/205; 359/215; 359/662
[58] Field of Search ................... 350/6.1–6.91, 350/412, 416, 426–434, 463–469, 417, 474–483, 415, 409; 250/234–236

[56] References Cited

U.S. PATENT DOCUMENTS

| 4,401,362 | 8/1983 | Maeda ........................... 350/475 |
| 4,674,825 | 6/1987 | Tateoka et al. ................. 350/6.8 |
| 4,787,723 | 11/1988 | Uetake .......................... 350/6.8 |

FOREIGN PATENT DOCUMENTS

| 53-137631 | 1/1978 | Japan . |
| 58-21711 | 8/1983 | Japan . |
| 62-254110 | 5/1987 | Japan . |

Primary Examiner—Bruce Y. Arnold
Assistant Examiner—Thong Nguyen
Attorney, Agent, or Firm—Sughrue, Mion, Zinn Macpeak & Seas

[57] ABSTRACT

An fθ lens comprises a first lens set having a positive or negative refracting power and a second lens set having a positive refracting power, which are located in that order from the side of a light deflector. The first lens set is composed of two lenses cemented together, and the second lens set is composed of a single lens. They satisfy the conditions $$0.2 \leq \Psi G2/\Psi \leq 1.5$$

$$r1, r2 < 0$$

$$0.3 \leq r3/r1 \leq 1.7$$

$$vd1 > vd2$$

where $\Psi$ denotes the reciprocal of the focal length of the whole fθ lens; $\Psi G2$ denotes the reciprocal of the focal length of the second lens set; r1, r2, and r3 denote the radii of curvature of the first, second, and third lens-surfaces, each radius taking a positive value when the lens surface is convex as viewed from the side of the light deflector; vd1 denotes the Abbe's dispersion number of the first lens of the first lens set; and vd2 denotes the Abbe's dispersion number of the second lens of the first lens set.

2 Claims, 7 Drawing Sheets

Fθ LENS

BACKGROUND OF THE INVENTION

1. Field of the Invention

This invention relates to an fθ lens used in a light beam scanning apparatus wherein a light beam is deflected by a light deflector and caused to scan a surface. This invention particularly relates to an fθ lens which exhibits a small curvature of field and a small chromatic aberration of magnification even at a large deflection angle, which is free of adverse effects from errors in processing and assembling the lens, and with which the light utilization efficiency can be kept high.

2. Description of the Prior Art

In light beam scanning apparatuses wherein light beams are deflected by light deflectors and caused to scan surfaces, fθ lenses have heretofore been used as scanning lenses. Specifically, a light beam is reflected and deflected at uniform angular velocity by a light deflector, such as a rotating polygon mirror or a galvanometer mirror. The velocity, at which the light beam scans a surface, should be proportional to the velocity (angular velocity), at which the light deflector deflects the light beam. For this purpose, an fθ lens having the characteristics of making the amount of movement of the light beam on the surface, which is to be scanned, proportional to the deflection angle θ should be located between the light deflector and the surface, which is to be scanned.

In general, the fθ lens is composed of a plurality of lenses. For example, Japanese Unexamined Patent Publication No. 53(1978)-137631 discloses an fθ lens which is composed of a single lens having a negative refracting power and a single lens having a positive refracting power. Also, Japanese Unexamined Patent Publication No. 58(1983)-21711 discloses an fθ lens which is composed of two lenses having a negative refracting power and a single lens having a positive refracting power.

However, the disclosed fθ lens, which is composed of two lenses, has the drawback in that, because the number of lenses is small, the degree of freedom of lens design is low, and it is difficult for an fθ lens having a small aberration to be designed. The disclosed fθ lens, which is composed of three lenses, has the drawback in that, because the number of lens surfaces is large, much light is reflected by the lens surfaces and the light utilization efficiency becomes low. Also, the three lenses, which constitute the fθ lens, are mounted on different lens mounts. Therefore, the performance of the fθ lens is readily affected by errors in mounting the three lenses.

In light beam scanning apparatuses, it is desired that the deflection angle be made large. When the deflection angle is large, the light beam scanning apparatus can be kept small in size and the scanning range can be kept large. In such cases, the fθ lens should exhibit a small chromatic aberration of magnification even at a large deflection angle. Specifically, in cases where a semiconductor laser (LD) is utilized as the light source, the wavelengths of the laser beam produced by the LD vary due to self-heating of the LD, a change in ambient temperature, or the like. Also, as disclosed in U.S. Pat. No. 4,814,791, in order for the intensity of the laser beam to be modulated over a wide dynamic range, both the natural emission region and the laser radiation region of the LD may be utilized. In such cases, the emission spectrum of the produced laser beam becomes broad. Further, as disclosed in U.S. Pat. No. 4,969,699, in an apparatus wherein laser beams produced by a plurality of LD's are combined and the combined laser beams are used to scan a surface, the wavelengths of the laser beams will differ from one another. In such cases, if the chromatic aberration of magnification is large, the position of the beam spot will deviate from the correct position along the scanning direction due to the fluctuation in the wavelengths of the laser beam. As a result, the image quality of an image, which is recorded with the beam spot on the surface to be scanned or is read out with the beam spot from the surface to be scanned, is affected adversely.

As disclosed in, for example, Japanese Unexamined Patent Publication No. 62(1987)-254110, an fθ lens has been proposed which exhibits a small chromatic aberration of magnification. However, the disclosed fθ lens is not free of the problems with regard to errors in lens mounting and the light utilization efficiency.

SUMMARY OF THE INVENTION

The primary object of the present invention is to provide an fθ lens which exhibits a small curvature of field and a small chromatic aberration of magnification even at a large deflection angle, which is free of adverse effects from errors in processing and assembling the lens, and with which the degree of freedom of lens design and the light utilization efficiency can be kept high.

Another object of the present invention is to provide an fθ lens which enables accurate scanning with a light beam to be carried out even when the wavelengths of the light beam fluctuate.

The present invention provides an fθ lens located between a light deflector, which deflects a light beam approximately at uniform angular velocity, and a surface, which is to be scanned, the fθ lens converging the light beam onto the surface, which is to be scanned, and causing the converged light beam to scan the surface approximately at uniform velocity, the fθ lens comprising a first lens set having a positive or negative refracting power and a second lens set having a positive refracting power, said first lens set and said second lens set lens being located in that order from the side of the light deflector, wherein said first lens set is composed of two lenses, which are cemented together, said second lens set is composed of a single lens, and said first-set lens and said second-set lens satisfy the conditions $$0.2 \leq \Psi G2/\Psi \leq 1.5 \qquad (1)$$

$$r1, r2 < 0 \qquad (2)$$

$$0.3 \leq r3/r1 \leq 1.7 \qquad (3)$$

$$vd1 > vd2 \qquad (4)$$

where $\Psi$ denotes the reciprocal of the focal length of the whole fθ lens; $\Psi G2$ denotes the reciprocal of the focal length of the second lens set; r1, r2, and r3 denote the radii of curvature of the first, second, and third lens-surfaces, each radius taking a positive value when the lens surface is convex as viewed from the side of the light deflector; vd1 denotes the Abbe's dispersion number of the first lens of the first lens set; and vd2 denotes the Abbe's dispersion number of the second lens of the first lens set.

The fθ lens in accordance with the present invention apparently comprises two lenses. Therefore, the amount of loss of the light beam due to reflection from the lens surfaces of the fθ lens in accordance with the present invention is approximately equal to the amount of loss of the light beam due to reflection from the lens surfaces of a conventional fθ lens, which is composed of two lenses. Accordingly, with the fθ lens in accordance with the present invention, the light beam impinging upon the fθ lens can be utilized efficiently as the scanning light. Also, the first lens set is composed of two lenses, which are cemented together, and has a weak refracting power. Therefore, the performance of the fθ lens in accordance with the present invention does not deteriorate much due to errors in the positions of the lenses which constitute the fθ lens. Accordingly, the fθ lens in accordance with the present invention is free of adverse effects from errors in processing and assembling the lens.

Also, the fθ lens in accordance with the present invention is actually composed of three lenses. Therefore, the degree of freedom of lens design is high, and the aberration of the whole fθ lens can be kept small. The fθ lens in accordance with the present invention eliminates the drawbacks of the conventional fθ lens, which is composed of two lenses, and the conventional fθ lens, which is composed of three lenses. The fθ lens in accordance with the present invention has the advantages of the two types of the conventional fθ lenses.

Additionally, the fθ lens in accordance with the present invention satisfies the conditions (1), (2), (3), and (4). Therefore, the curvature of field and the chromatic aberration of magnification can be kept small even when the deflection angle is as large as approximately 90°. As a result, accurate scanning with a light beam can be carried out even when the wavelengths of the light beam fluctuate.

How the conditions (1), (2), (3), and (4) were determined will be described hereinbelow. First, the condition r1, r2<0 was set so that the first and second surfaces of the fθ lens may be concave as viewed from the side of the position at which the light beam is deflected. Also, the condition vd1>vd2 was set so that the chromatic aberration may be eliminated. Thereafter, for parameters ΨG2/Ψ and r3/r1, the curvature of field along the main scanning direction (FCM), the chromatic aberration (CL), and the fθ characteristic were investigated. Tables 1 and 2 show the results of the investigation. In Table 1, the results of the investigation are listed in the order of the value of ΨG2/Ψ. In Table 2, the results of the investigation are listed in the order of the value of r3/r1. In Tables 1 and 2, the ⊙ mark indicates that the performance is very good, and the ○ mark indicates that the performance is good. Also, the △ mark indicates that the performance is of an acceptable level, and the X mark indicates that the performance is bad.

TABLE 1

| ΨG2/Ψ | r3/r1 | FCM | CL | fθ characteristic |
|---|---|---|---|---|
| 0.10 | 0.279 | X | ○ | X |
| 0.20 | 0.192 | △ | △ | ○ |
| 0.20 | 0.258 | X | ○ | X |
| 0.20 | 0.325 | ○ | ○ | ⊙ |
| 0.30 | 0.347 | ○ | △ | ○ |
| 0.40 | 0.355 | ○ | ○ | ○ |
| 0.73 | 0.176 | ⊙ | ○ | ○ |
| 0.97 | 1.712 | △ | ○ | ○ |

TABLE 1-continued

| ΨG2/Ψ | r3/r1 | FCM | CL | fθ characteristic |
|---|---|---|---|---|
| 1.00 | 1.525 | △ | ○ | ○ |
| 1.11 | 0.913 | ⊙ | ⊙ | ○ |
| 1.32 | 0.669 | △ | ○ | △ |
| 1.50 | 3.876 | △ | ○ | △ |
| 2.00 | 2.000 | ○ | X | X |

TABLE 2

| r3/r1 | FCM | CL | fθ characteristic |
|---|---|---|---|
| 0.176 | ⊙ | ○ | ○ |
| 0.192 | △ | △ | ○ |
| 0.258 | X | ○ | X |
| 0.279 | X | ○ | X |
| 0.325 | ○ | ○ | ⊙ |
| 0.347 | ○ | △ | ○ |
| 0.355 | ○ | ○ | ○ |
| 0.669 | △ | ○ | △ |
| 0.913 | ⊙ | ⊙ | ○ |
| 1.525 | △ | ○ | ○ |
| 1.712 | △ | ○ | ○ |
| 2.000 | ○ | X | X |
| 3.876 | △ | ○ | △ |

From the results of the investigation shown in Tables 1 and 2, the conditions (1), (2), (3) and (4) were determined.

The conditions (1) and (3) specify that the power of the first-set lens may not be very large. Therefore, the fθ lens is free of adverse effects from errors in processing and assembling the lens.

As shown in Table 2, some values of r3/r1 beyond the range specified by the condition (3) yield good performance. However, they are ideal examples which may be employed in cases where no error occurs in processing and assembling the lens. In cases where the power of the first lens set is very large, the performance of the fθ lens will deteriorate due to slight errors in processing and assembling the lens. Therefore, the aforesaid values were excluded from the range specified by the condition (3).

The condition (2) was set in order that the angles of incidence of a light beam upon the first and second surfaces of the fθ lens may be kept small at a large deflection angle and the aberration may be kept small. When the condition (2) is satisfied, good performance can be obtained even when the deflection angle is as large as approximately 90°.

The condition (4) was set for the elimination of the chromatic aberration.

DESCRIPTION OF THE PREFERRED EMBODIMENTS

The present invention will hereinbelow be described in further detail with reference to the accompanying drawings.

Figure 1:
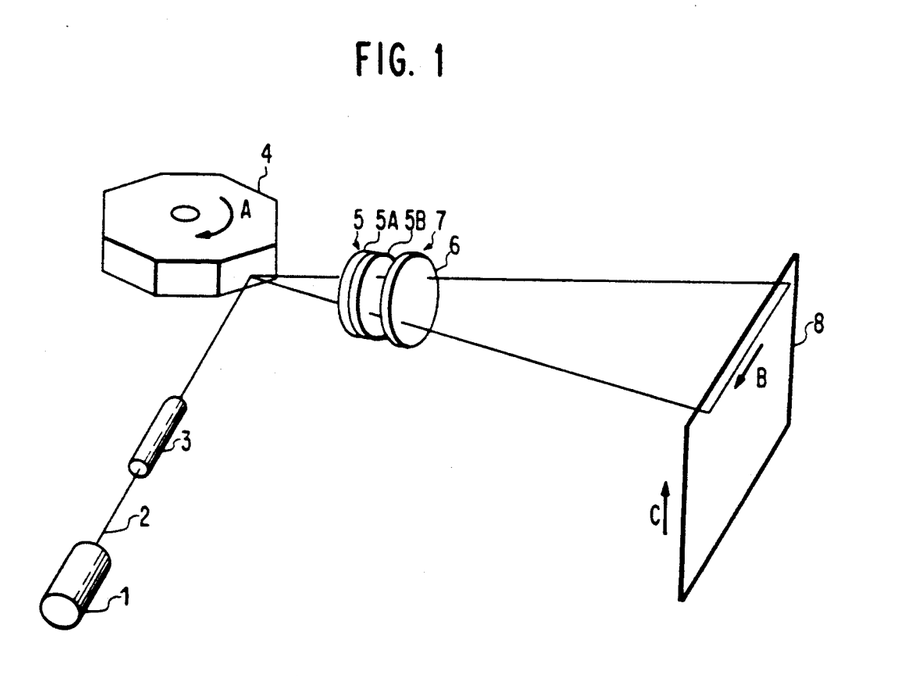
FIG. 1 is a perspective view showing a light beam scanning apparatus wherein a first embodiment of the fθ lens in accordance with the present invention is employed.
Figure 2:
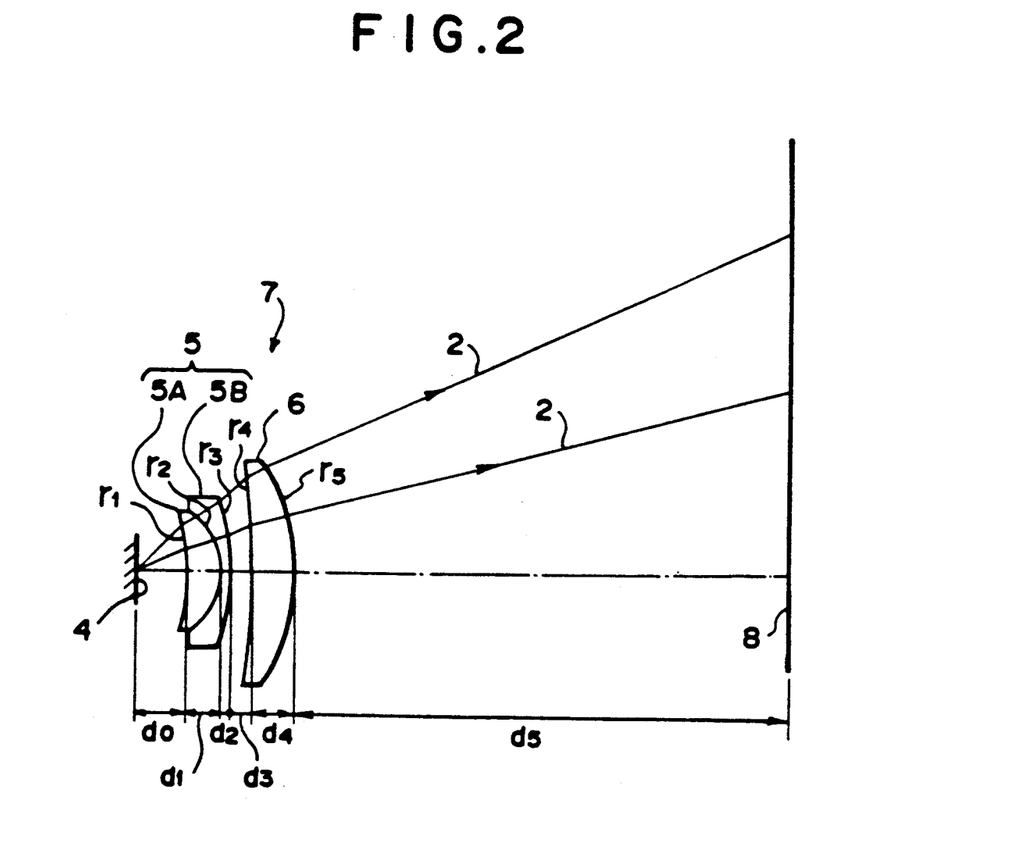
FIG. 2 is a side view showing the first embodiment of the fθ lens.

FIG. 1 is a perspective view showing a light beam scanning apparatus wherein a first embodiment of the fθ lens in accordance with the present invention is employed. FIG. 2 is a side view showing the first embodiment of the fθ lens.

With reference to FIG. 1, a light beam 2 is produced by a light source 1. The light beam 2 is collimated and its beam diameter is enlarged to a desired value by a beam expander 3. Thereafter, the light beam 2 impinges upon a rotating polygon mirror 4, which rotates in the direction indicated by the arrow A. The light beam 2 is reflected and deflected by the rotating polygon mirror 4 and thereafter passes through an fθ lens 7, which is located in the optical path. The light beam 2 scans a surface 8 in the main scanning direction indicated by the arrow B. At the same time, the surface 8, which is to be scanned, is conveyed approximately at a constant velocity in the sub-scanning direction indicated by the arrow C.

The light beam 2 is deflected by the rotating polygon mirror 4 approximately at uniform angular velocity. The fθ lens 7 converges the deflected light beam 2 onto the flat surface 8 and causes it to scan the surface 8 approximately at uniform velocity The fθ lens 7 comprises a first lens set 5, which is located on the side of the rotating polygon mirror 4 and which has a negative refracting power, and a second lens set 6, which is located on the side of the surface 8 and which has a positive refracting power. The first lens set 5 is composed of a first lens 5A, which is located on the side of the position at which the light beam 2 is deflected, and a second lens 5B, which is located on the side of the surface 8. The first lens 5A and the second lens 5B are cemented together.

With the fθ lens 7 comprising the first lens set 5 and the second lens set 6, the light beam 2 can be caused to scan the surface 8 approximately at uniform velocity. Therefore, the scanning in two directions can be carried out accurately.

Values of the lenses, which constitute the fθ lens 7, will be listed below. In FIG. 2, r1, r2, r3, r4, and r5 denote the radii of curvature of the surfaces of the respective lenses Each radius takes a positive value when the lens surface is convex as viewed from the side of the rotating polygon mirror 4. Also, d1, d2, and d4 denote the axial thicknesses of the lenses 5A, 5B, and 6, and d3 denotes the axial air separation between the first lens set 5 and the second lens set 6. Additionally, d0 denotes the distance between the point, at which the light beam 2 is deflected, and the first surface of the fθ lens 7, i.e. the surface of the lens 5A having the radius of curvature of r1. Further, d5 denotes the distance between the final surface of the fθ lens 7, i.e. the surface of the second lens set 6 having the radius of curvature of r5, and the surface 8 which is to be scanned. In the descriptions below, nd1, nd2, and nd4 denote the refractive indices of the lenses 5A, 5B, and 6 with respect to the d-line (wavelength: 587.6 nm). Also, vd1, vd2, and vd4 denote the Abbe's dispersion numbers of the lenses 5A, 5B, and 6.

Additionally, fG1, and fG2 denote the focal lengths of the first lens set 5 and the second lens set 6. Further, fθ denotes the focal length of the whole fθ lens 7. These focal lengths are the values with respect to light having a wavelength of 680 nm. The meanings of the symbols also apply to the second and third embodiments of the fθ lens in accordance with the present invention, which will be described later. Also, the unit of the length is mm.

|  | d0 = 11.761 |  |
|---|---|---|
| r1 = −54.026 | d1 = 8.084 | nd1 = 1.67003 |
| r2 = −16.071 | d2 = 1.971 | nd2 = 1.80518 |
| r3 = −48.890 | d3 = 4.897 |  |
| r4 = −195.709 | d4 = 10.215 | nd4 = 1.67003 |
| r5 = −46.176 | d5 = 113.708 |  |
| vd1 = 47.2 |  |  |
| vd2 = 25.5 |  |  |
| vd4 = 47.2 |  |  |
| fG1 = −308.6 | fG2 = 84.6 | fl = 99.7 |

Investigations will be made hereinbelow as to whether the values listed above satisfy or do not satisfy the conditions (1) through (4) described above.

Because $$\Psi = 1/fl = 0.01003$$

$$\Psi G2 = 1/fG2 = 0.01182$$

the following relationship obtains:

$$0.2 \leq \Psi G2/\Psi = 1.18 \leq 1.5$$

Therefore, the condition (1) is satisfied. Also, because r1 = 54.026 and r2 = −16.071, the condition (2) is satisfied. Additionally, the condition (3) is satisfied because $$r3/r1 = -48.890/-54.026 = 0.905$$

$$0.3 \leq 0.905 \leq 1.7$$

further, the condition (4) is satisified because $$vd1 = 47.2 > vd2 = 25.5$$

Figures 5A, 5B:
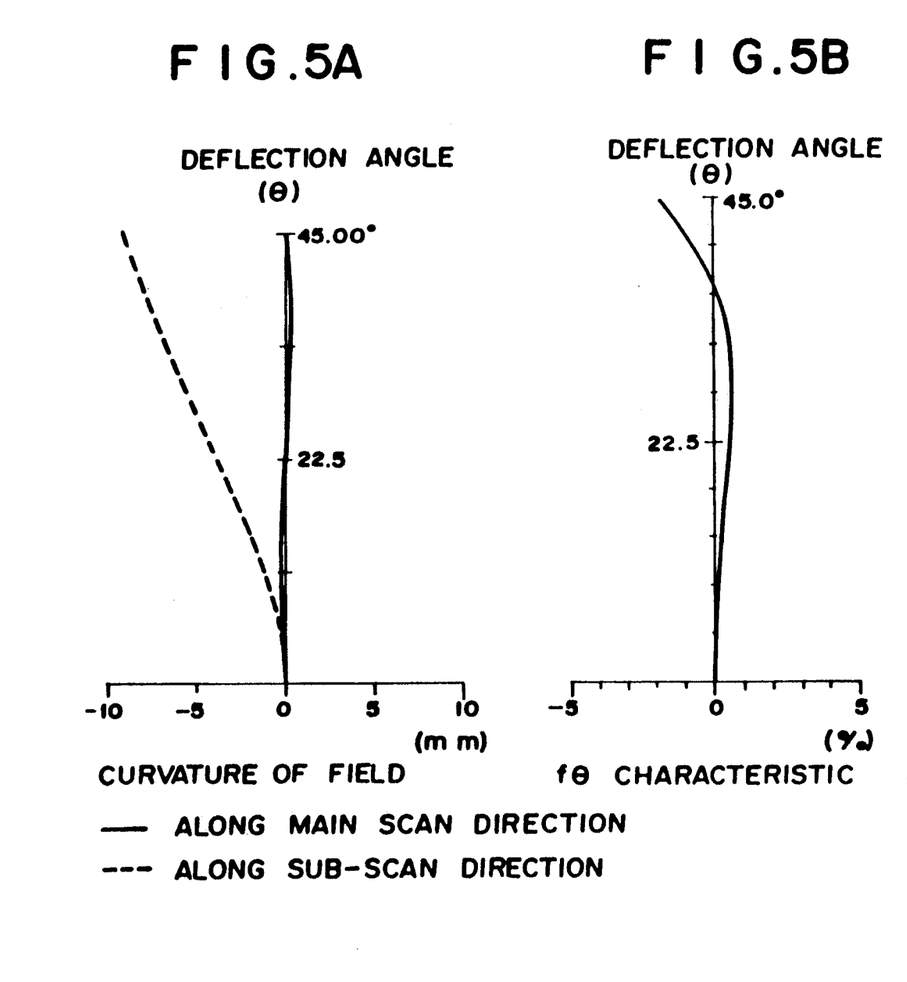
FIGS. 5A, 5B, and 5C are graphs showing the aberration of the first embodiment of the fθ lens in accordance with the present invention.
Figure 5C:
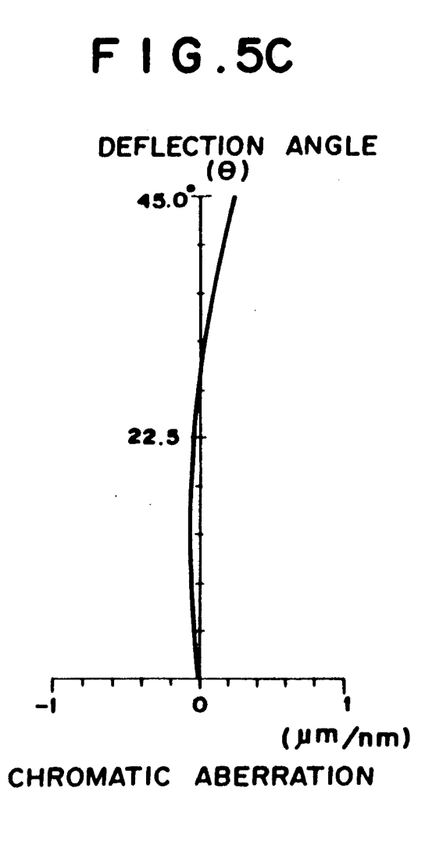

FIGS. 5A, 5B, and 5C show the aberration occurring when the light beam 2 is caused to scan the surface 8 with the first embodiment of the fθ lens 7 at the deflection angle of ±45°. The fθ characteristic is defined by the value calculated with the formula $$f\theta = \frac{(dH/d\theta)_{\theta=\theta^\circ} - (dH/d\theta)_{\theta=\theta^\circ}}{(dH/d\theta)_{\theta=\theta^\circ}} \times 100(\%)$$

where H denotes the height at a deflection angle θ on the image surface. The chromatic aberration of magnification shown in FIG. 5C was found in the manner described below. Specifically, a light beam 2 having a wavelength of 680 nm was utilized as reference light The light beam 2 was deflected by θ° from the direction of incidence normal to the surface 8, and the position on the surface 8, which was being scanned at this time, was taken as the reference scanning position Thereafter, the wavelength of the light beam 2 was changed by ±10 nm, and the position, which was being scanned when the light beam 2 was deflected by θ° in he same manner as that described above, was found. The difference between the position thus found and the aforesaid reference scanning position was calculated. The chromatic aberration of magnification was expressed with the value of the difference (in μm) per nm of the change in the wavelength of the light beam 2

As shown in FIGS. 5A and 5B, with this embodiment of the fθ lens, the curvature of field along the main scanning direction can be kept small, and the fθ characteristic can be kept good No problem occurs from the curvature of field along the sub-scanning direction. This is because the curvature of field along the sub-scanning direction can be eliminated by a surface inclination eliminating optical system. Also, as shown in FIG. 5C, even when the deflection angle is as large as ±45°, the chromatic aberration of magnification can be kept very small. Specifically, it can be kept smaller than 0.246 μm/nm.

Figure 3:
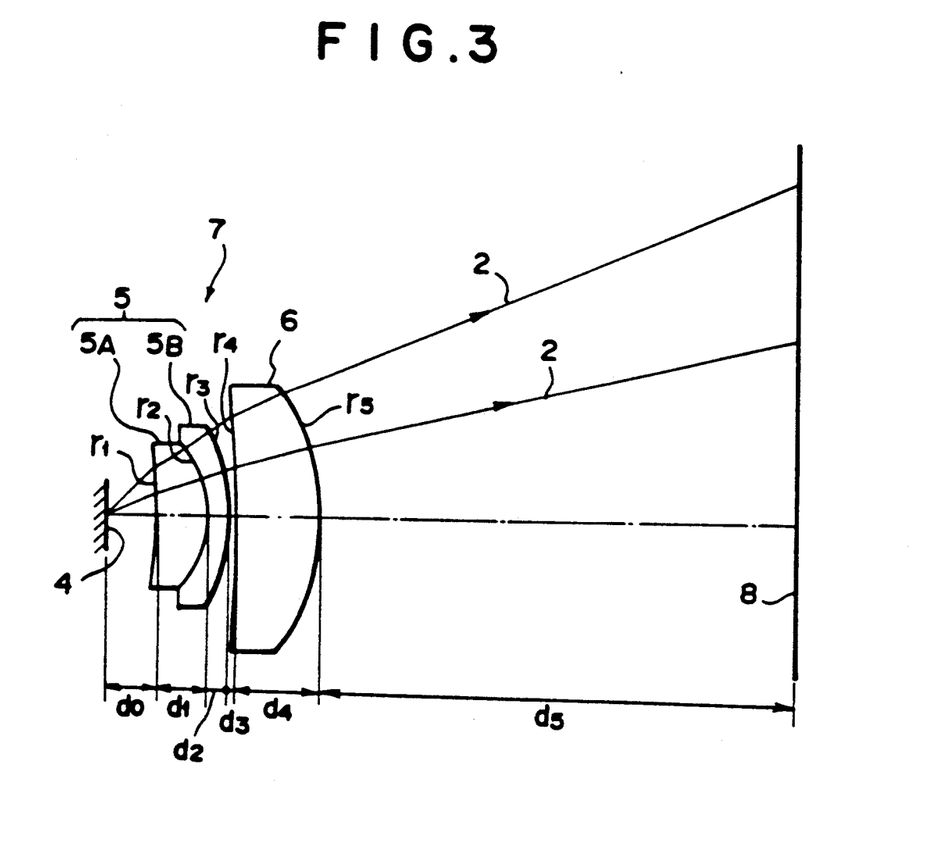
FIGS. 3 and 4 are side views showing second and third embodiments of the fθ lens in accordance with the present invention.

FIG. 3 is a side view showing a second embodiment of the fθ lens 7 in accordance with the present invention. In the second embodiment, the lenses, which constitute the fθ lens 7, have the values listed below

|  | d0 = 11.761 |  |
|---|---|---|
| r1 = −99.742 | d1 = 12.060 | nd1 = 1.45650 |
| r2 = −23.777 | d2 = 5.408 | nd2 = 1.80518 |
| r3 = −40.256 | d3 = 0.987 |  |
| r4 = −228.286 | d4 = 19.711 | nd4 = 1.45650 |
| r5 = −49.944 | d5 = 109.068 |  |
| vd1 = 90.8 |  |  |
| vd2 = 25.5 |  |  |
| vd4 = 90.8 |  |  |
| fG1 = 444.4 | fG2 = 135.9 | fl = 99.8 |

Investigations will be made hereinbelow as to whether the values listed above satisfy or do not satisfy the conditions (1) through (4) described above.
Because $$\Psi = 1/fl = 0.01002$$

$$\Psi G2 = 1/fG2 = 0.00225$$

the following relationship obtains:

$$0.2 \leq \Psi G2/\Psi = 0.22 \leq 1.5$$

Therefore, the condition (1) is satisfied. Also, because r1 = <99.742 and r2 = −23.777, the condition (2) is satisfied. Additionally, the condition (3) is satisfied because $$r3/r1 = -40.256/-99.742 = 0.404$$

$$0.3 \geq 0.404 \geq 1.7$$

Further, the condition (4) is satisfied because $$vd1 = 90.8 > vd2 = 25.5$$

Figures 6A, 6B:
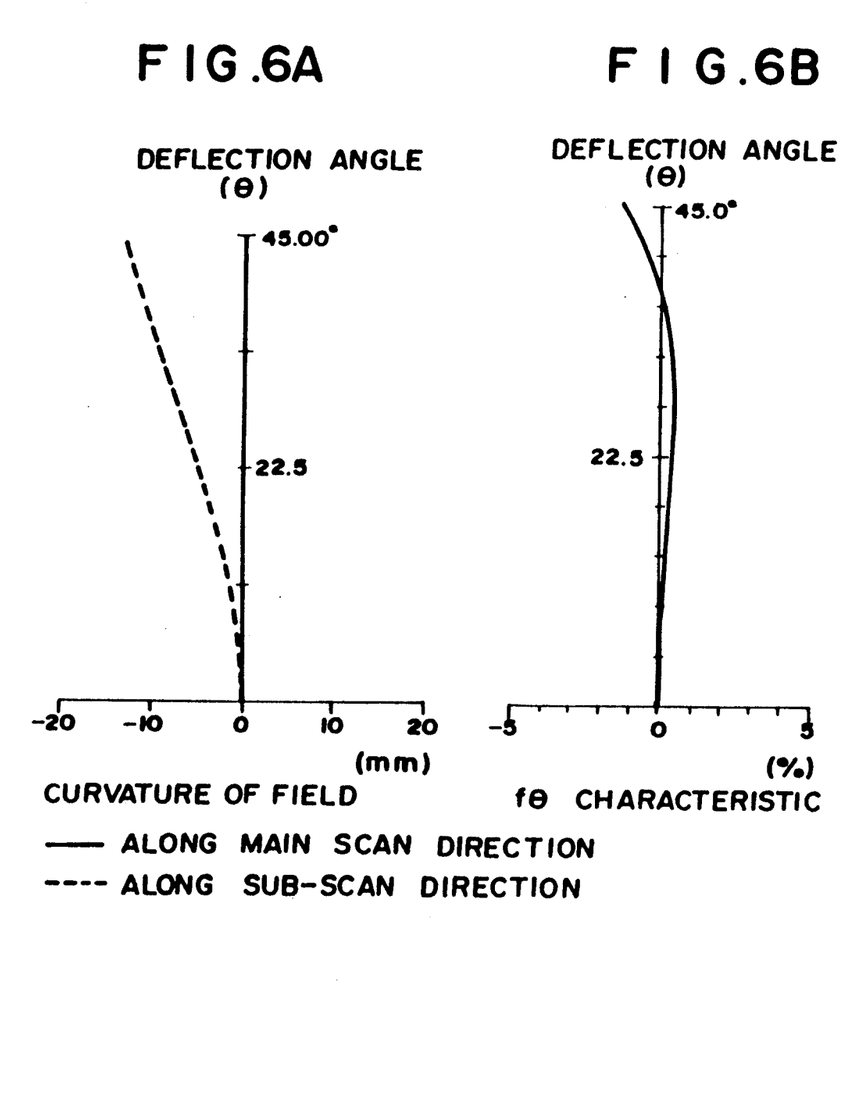
FIGS. 6A, 6B, and 6C are graphs showing the aberration of the second embodiment of the fθ lens in accordance with the present invention.
Figure 6C:
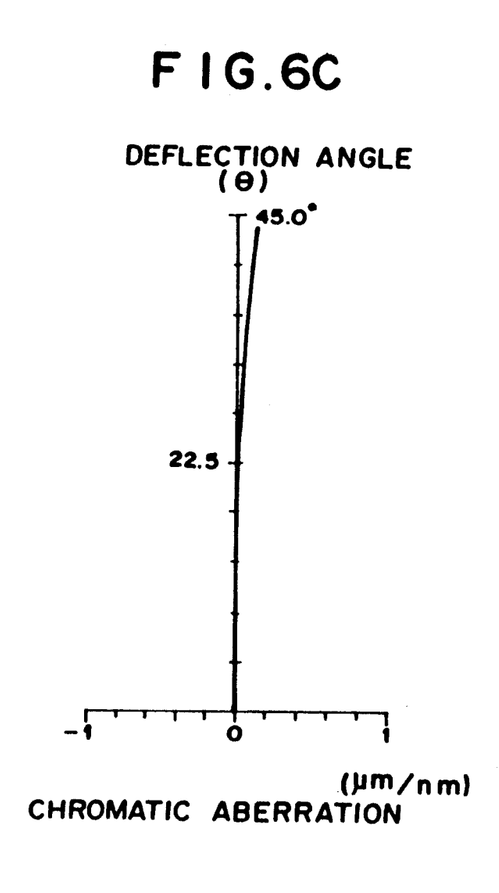

As shown in FIGS. 6A and 6B, with the second embodiment of the fθ lens, the curvature of field along the main scanning direction can be kept small, and the fθ characteristic can be kept good. No problem occurs from the curvature of field along the sub-scanning direction. This is because the curvature of field along the sub-scanning direction can be eliminated by a surface inclination eliminating optical system. Also, as shown in FIG. 6C, even when the deflection angle is as large as ±45°, the chromatic aberration of magnification can be kept very small. Specifically, it can be kept smaller than 0.129 μm/nm.

Figure 4:
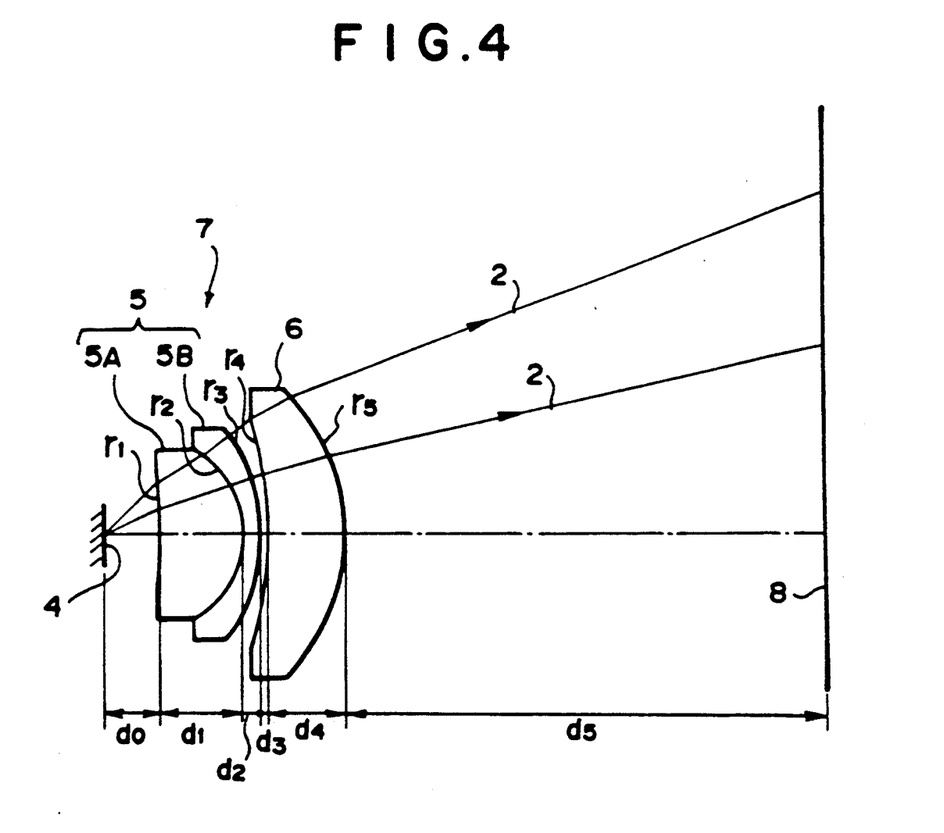

FIG. 4 is a side view showing a third embodiment of the fθ lens 7 in accordance with the present invention. In the third embodiment, the lenses, which constitute the fθ lens 7, have the values listed below.

|  | d0 = 11.761 |  |
|---|---|---|
| r1 = −188.683 | d1 = 19.861 | nd1 = 1.45650 |
| r2 = −21.846 | d2 = 4.339 | nd2 = 1.80518 |
| r3 = −39.225 | d3 = 1.246 |  |
| r4 = −91.148 | d4 = 17.916 | nd4 = 1.54072 |
| r5 = −45.791 | d5 = 110.580 |  |
| vd1 = 90.8 |  |  |
| vd2 = 25.5 |  |  |
| vd4 = 47.2 |  |  |
| fG1 = 297.6 | fG2 = 150.8 | fl = 99.8 |

Investigations will be made hereinbelow as to whether the values listed above satisfy or do not satisfy the conditions (1) through (4) described above.
Because $$\Psi = 1/fl = 0.01002$$

$$\Psi G2 = 1/fG2\ 32\ 0.00663$$

the following relationship obtains $$0.2 \leq \Psi G2/\Psi = 0.66 \leq 1.5$$

Therefore, the condition (1) is satisfied. Also, because r1 = −188.683 and r2 = −21.846, the condition (2) is satisfied Additionally, the condition (3) is satisfied because $$r3/r1 = -39.225/-188.683 = 0.207$$

$$0.3 \leq 0.207 \leq 1.7$$

Further, the condition (4) is satisfied because $$vd1 = 90.8 > vd2 = 25.5$$

Figures 7A, 7B:
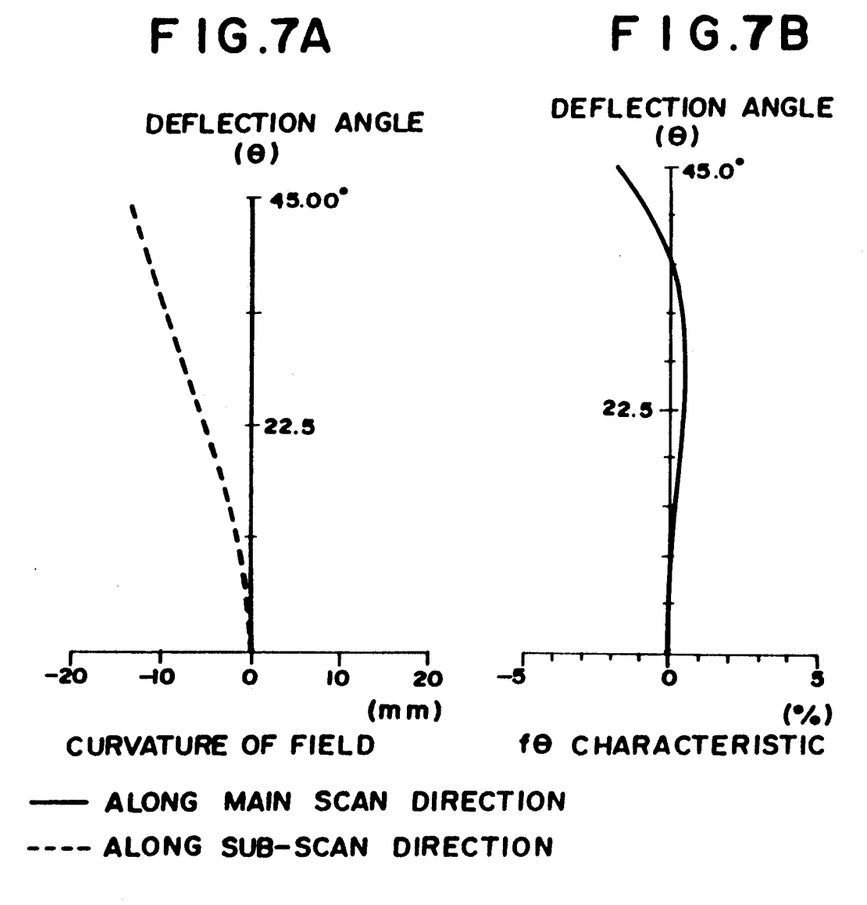
FIGS. 7A, 7B, and 7C are graphs showing the aberration of the third embodiment of the fθ lens in accordance with the present invention.
Figure 7C:
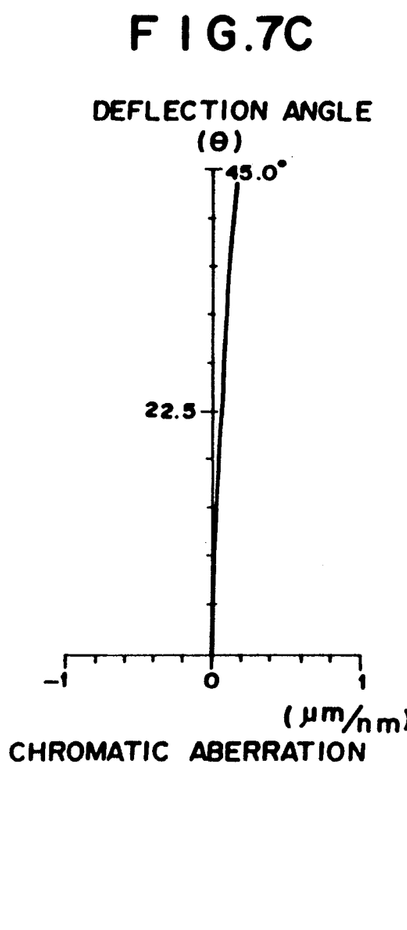

As shown in FIGS. 7A and 7B, with the third embodiment of the fθ lens, the curvature of field along the main scanning direction can be kept small, and the fθ characteristic can be kept good. No problem occurs from the curvature of field along the sub-scanning direction. This is because the curvature of field along the sub-scanning direction can be eliminated by a surface inclination eliminating optical system. Also, as shown in FIG. 7C, even when the deflection angle is as large as ±45°, the chromatic aberration of magnification can be kept very small. Specifically, it can be kept smaller than 0.169 μm/nm.

What is claimed is:

1. An fθ lens located between a light deflector, which deflects a light beam approximately at uniform angular velocity, and a surface, which is to be scanned, the fθ lens converges the light beam onto the surface and causes the converged light beam to scan the surface approximately at uniform velocity, the fθ lens comprising: a first lens set having a positive or negative refracting power and a second lens set having a positive refracting power, said first lens set and second lens set being located in that order from the side of said light deflector,
   wherein said first lens set is composed of a first lens and a second lens, which are cemented together, said second lens set is composed of a single lens, and said first lens set and said second lens set satisfy the conditions $$0.2 \leq \Psi G2/\Psi \leq 1.5$$

$$r1, r2 < 0$$

$$0.3 \leq r3/r1 \leq 1.7$$

$$vd1 > vd2$$

where $\Psi$ denotes the reciprocal of the focal length of the whole $f\theta$ lens; $\Omega G2$ denotes the reciprocal of the focal length of the second lens set; r1, r2 and r3 denote radii of curvature of first, second, and third surfaces of said first and second lenses, each radius taking a positive value when the corresponding lens surface is convex as viewed from the side of the light deflector; vd1 denotes the Abbe's dispersion number of said first lens of said first lens set; and vd2 denotes the Abbe's dispersion number of said second lens of said first lens set.

2. An $f\theta$ lens as defined in claim 1 wherein said light beam is a laser beam.

* * * * *